United States Patent
Gandhewar et al.

(10) Patent No.: US 12,155,531 B2
(45) Date of Patent: Nov. 26, 2024

(54) SELF-DRIVEN AND ADAPTABLE MULTI-VBNG MANAGEMENT ORCHESTRATION

(71) Applicant: Juniper Networks, Inc., Sunnyvale, CA (US)

(72) Inventors: Sunil Madhaorao Gandhewar, Umarkhed (IN); Nirmal Antony X, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/473,650

(22) Filed: Sep. 25, 2023

(65) Prior Publication Data
US 2024/0022476 A1  Jan. 18, 2024

Related U.S. Application Data

(60) Division of application No. 17/450,804, filed on Oct. 13, 2021, now Pat. No. 11,818,009, which is a
(Continued)

(51) Int. Cl.
*H04L 41/08*  (2022.01)
*H04L 9/40*  (2022.01)
(Continued)

(52) U.S. Cl.
CPC ...... *H04L 41/0893* (2013.01); *H04L 41/0896* (2013.01); *H04L 43/0817* (2013.01);
(Continued)

(58) Field of Classification Search
CPC ............ H04L 41/0893; H04L 41/0896; H04L 43/0817; H04L 47/125; H04L 47/41;
(Continued)

(56) References Cited

U.S. PATENT DOCUMENTS 6,950,848 B1  9/2005  Yousefi'zadeh
8,713,151 B2 *  4/2014  Gao ................. H04L 41/0893
                                            709/226
(Continued)

FOREIGN PATENT DOCUMENTS

CN  101778005 A  7/2010
CN  105306333 A  2/2016
(Continued)

OTHER PUBLICATIONS

Response to Extended Search Report dated Jul. 31, 2023, from counterpart European Application No. 23166586.0 filed Feb. 27, 2024, 30 pp.
(Continued)

*Primary Examiner* — Steven Hieu D Nguyen
(74) *Attorney, Agent, or Firm* — Shumaker & Sieffert, P.A.

(57) ABSTRACT

A broadband network gateway (BNG) controller is described that includes a network subscriber database (NSDB) and one or more core applications. The NSDB is configured to store vBNG instance information for one or more subscriber devices. The vBNG instance information specifies vBNG instances operable by one or more edge routers. The vBNG instances are configured to receive requests to access service provider services from the one or more subscriber devices and to selectively authenticate the one or more subscriber devices for network services based on authentication information included in the requests to access services provider services. The one or more core applications include a network instance and configuration manager (NICM). The NICM is configured to modify the vBNG instance information at the NSDB to include an additional vBNG instance and to output, to an edge router,
(Continued)

an instruction to generate the additional vBNG instance at the edge router.

12 Claims, 7 Drawing Sheets

Related U.S. Application Data continuation of application No. 16/706,016, filed on Dec. 6, 2019, now Pat. No. 11,159,378, which is a division of application No. 15/890,589, filed on Feb. 7, 2018, now Pat. No. 10,560,331.

(51) Int. Cl.

| | | |
|---|---|---|
| *H04L 41/0893* | (2022.01) | |
| *H04L 41/0896* | (2022.01) | |
| *H04L 43/0817* | (2022.01) | |
| *H04L 47/125* | (2022.01) | |
| *H04L 47/41* | (2022.01) | |
| *H04L 47/10* | (2022.01) | |
| *H04L 67/1004* | (2022.01) | |
| *H04W 12/06* | (2021.01) | |

(52) U.S. Cl.
CPC ............ *H04L 47/125* (2013.01); *H04L 47/41* (2013.01); *H04L 63/0272* (2013.01); *H04L 63/0892* (2013.01); *H04L 47/18* (2013.01); *H04L 63/145* (2013.01); *H04L 63/1458* (2013.01); *H04L 67/1004* (2013.01); *H04W 12/06* (2013.01)

(58) Field of Classification Search
CPC . H04L 63/0272; H04L 63/0892; H04L 47/18; H04L 63/145; H04L 63/1458; H04L 67/1004; H04L 41/0894; H04L 41/0895; H04L 41/40; H04L 47/726; H04L 47/74; H04L 47/78; H04L 47/822; H04L 47/828; H04L 12/66; H04L 63/20; H04L 63/08; H04W 12/06; G06F 9/45558; G06F 2009/4557; G06F 2009/45595
See application file for complete search history.

(56) References Cited

U.S. PATENT DOCUMENTS

| | | | |
|---|---|---|---|
| 9,420,492 B2 | 8/2016 | Zheng et al. | |
| 9,634,936 B2 | 4/2017 | Bansal et al. | |
| 10,237,176 B2 | 3/2019 | Mutnuru et al. | |
| 10,560,331 B2 * | 2/2020 | Gandhewar | ......... H04L 41/0893 |
| 10,791,167 B2 | 9/2020 | Cui | |
| 11,159,378 B2 | 10/2021 | Gandhewar et al. | |
| 11,818,009 B2 * | 11/2023 | Gandhewar | ......... H04L 41/0893 |
| 2005/0114174 A1 | 5/2005 | Raden et al. | |
| 2008/0082989 A1 | 4/2008 | Walker | |
| 2008/0186982 A1 | 8/2008 | Chang et al. | |
| 2010/0046531 A1 * | 2/2010 | Louati | .................. H04L 45/00 370/401 |
| 2010/0293385 A1 | 11/2010 | Nanda et al. | |
| 2011/0029970 A1 * | 2/2011 | Arasaratnam | ....... G06F 9/45558 718/1 |
| 2013/0091282 A1 * | 4/2013 | Tontiruttananon | .... G06F 9/5061 709/226 |
| 2014/0226642 A1 | 8/2014 | Haddad et al. | |
| 2015/0173123 A1 * | 6/2015 | Luessem | ............ H04L 65/1069 370/328 |
| 2015/0339150 A1 | 11/2015 | Yanagisawa et al. | |
| 2016/0105483 A1 | 4/2016 | Zhu et al. | |
| 2016/0127506 A1 | 5/2016 | Shinohara | |
| 2016/0269278 A1 * | 9/2016 | Gopalarathnam | ...... H04L 45/22 |
| 2017/0034155 A1 | 2/2017 | Khalil | |
| 2018/0034664 A1 | 2/2018 | Mulligan et al. | |
| 2019/0372879 A1 | 12/2019 | Poe et al. | |
| 2020/0170066 A1 | 5/2020 | Yang et al. | |

FOREIGN PATENT DOCUMENTS

| | | | |
|---|---|---|---|
| CN | 105634956 A | 6/2016 | |
| CN | 106487788 A | 3/2017 | |
| CN | 107566440 A | 1/2018 | |
| CN | 107666419 A | 2/2018 | |
| EP | 2536068 A1 | 12/2012 | |
| EP | 2632082 A2 | 8/2013 | |
| EP | 3493483 A1 | 6/2019 | |
| WO | 2016141995 A1 | 9/2016 | |
| WO | 2017054718 A1 | 4/2017 | |
| WO | WO-2018019299 A1 * | 2/2018 | ......... H04L 12/2801 |
| WO | 2018129957 A1 | 7/2018 | |

OTHER PUBLICATIONS

Response to Extended Search Report dated Jul. 17, 2023, from counterpart European Application No. 23166362.6 filed Feb. 9, 2024, 31 pp.
Response to Extended Search Report dated Jul. 17, 2023, from counterpart European Application No. 23167099.3 filed Feb. 13, 2024, 40 pp.
"Output—Draft Recommendation Q.SCO, Scenarios and Signalling Requirements for SDN Based Central Office," International Telecommunication Union, Study Group 11 TD 42 (GEN/11), Q4/11 e-meeting, Nov. 22-23, 2016, 16 pp.
"Signalling Requirements for SDN and NFV Based Central Office Services," International Telecommunication Union, ITU-T Standard Q.3740, Jan. 13, 2018, 17 pp.
Examination Report from counterpart European Application No. 18209387.2, dated Jul. 1, 2020, 7 pp.
Examination Report from counterpart European Application No. 18209387.2, dated Jun. 14, 2021, 7 pp.
Extended Search Report from counterpart European Application No. 18209387.2, dated Mar. 27, 2019, 12 pp.
Extended Search Report from counterpart European Application No. 23166362.6 dated Jul. 17, 2023, 12 pp.
Extended Search Report from counterpart European Application No. 23166586.0 dated Jul. 31, 2023, 11 pp.
Extended Search Report from counterpart European Application No. 23167099.3 dated Jul. 17, 2023, 13 pp.
First Office Action and Search Report, and translation thereof, from counterpart Chinese Application No. 201811459200.8, dated Jul. 6, 2020, 12 pp.
First Office Action and Search Report, and translation thereof, from counterpart Chinese Application No. 2021103650374 dated Mar. 1, 2023, 21 pp.
ITU-T Q.3740, Signalling Requirements for SDN and NFV based Central Office services, The International Telecommunications Union, Jan. 13, 2018, 22 pp.
Mamouni et al., "Universal AAA for Hybrid Access: How to Smoothly Unify Subscriber Data and Session Management in Convergent Networks?," 2015 European Conference on Networks and Communications (EuCNC), IEEE, Jun. 29, 2015, pp. 403-407.
Notice of Intent to Grant and Text Intended to Grant from counterpart European Application No. 18209387.2 dated Dec. 6, 2022, 91 pp.
Notice of Intent to Grant and Text Intended to Grant from counterpart European Application No. 18209387.2 dated May 4, 2023, 50 pp.
Notice of Intent to Grant and Text Intended to Grant from counterpart European Application No. 18209387.2 dated Sep. 20, 2023, 50 pp.
Prosecution History from U.S. Appl. No. 17/450,804, dated Oct. 18, 2022 through Oct. 10, 2023, 84 pp.
Prosecution History of U.S. Appl. No. 15/890,589 dated Apr. 30, 2019 through Oct. 25, 2019, 44 pp.
Prosecution History of U.S. Appl. No. 16/706,016 dated Mar. 23, 2021 through Jul. 28, 2021, 49 pp.

(56) References Cited

OTHER PUBLICATIONS

Response filed Oct. 27, 2020 to the Examination Report from counterpart European Application No. 18209387.2, dated Jul. 1, 2020, 20 pp.
Response to Examination Report dated Jun. 14, 2021, from counterpart European Application No. 18209387.2 filed Oct. 14, 2021, 20 pp.
Response to Extended Search Report dated Mar. 27, 2019, from counterpart European Application No. 18209387.2, filed Feb. 14, 2020, 26 pp.
Rigney et al., "Remote Authentication Dial In User Service (RADIUS)," RFC 2865, Network Working Group, Jun. 2000, 76 pp.
Second Office Action and Search Report, and translation thereof, from counterpart Chinese Application No. 202110365037.4 dated Jul. 29, 2023, 18 pp.

* cited by examiner

SELF-DRIVEN AND ADAPTABLE MULTI-VBNG MANAGEMENT ORCHESTRATION

This application is a divisional filing of U.S. patent application Ser. No. 17/450,804, filed Oct. 13, 2021, which is a continuation of U.S. patent application Ser. No. 16/706,016, filed Dec. 6, 2019, now issued as U.S. Pat. No. 11,159,378 on Oct. 26, 2021, which is a divisional of U.S. patent application Ser. No. 15/890,589 filed Feb. 7, 2018, now issued as U.S. Pat. No. 10,560,331 on Feb. 11, 2020, the entire contents of which are herein incorporated by reference.

TECHNICAL FIELD

The invention relates to computer networks and, more specifically, to improving an operation of edge routers operating as broadband network gateways.

BACKGROUND

Large-scale applications geographically distributed over large areas often process large distributed datasets that require massive data transfer over a wide area network. Service provider networks typically provide an extensive network infrastructure to support packet-based data services offered for use by subscribers. The network infrastructure typically includes a vast collection of broadband network gateways (BNGs) that facilitate subscriber access to a wide area network (e.g., the Internet). These BNGs, which may also be referred to as "access devices," may execute various protocols and exchange signaling messages to anchor and manage subscriber sessions and communication flows associated with the subscribers.

SUMMARY

In general, techniques are described for enabling a consolidated self-driven deployment of "virtual" broadband network gateways (vBNGs). Rather than provisioning a physical BNG for each access point of a wide area network, a service provider network may include a self-driven BNG controller that elastically provisions vBNG instances to satisfy subscriber demand. For example, the BNG controller may increase a number of vBNG instances provisioned on edge routers of a wide area network when existing vBNG instances have reached or are approaching a subscriber capacity. After increasing the number of vBNG instances provisioned on the edge routers, the BNG controller may load balance the vBNG instances. In this way, edge routers may be dynamically configured with vBNG instances without user intervention.

In some examples, a BNG controller manages BNG instances (e.g., physical, virtual, etc.). These vBNG instances may manage subscriber logins for network subscribers and may terminate network subscribers by the authenticating to provide subscriber services such as, but not limited to, for example, Internet connection, a firewall, a class of service (CoS), or another subscriber service. The BNG controller may include a memory, one or more processors in communication with the memory, a network subscriber database (NSDB), and one or more core applications. The NSDB is configured to store vBNG instance information for one or more subscriber devices and one or more vBNG instance information. The vBNG instance information specifies a plurality of vBNG instances operable by one or more edge routers. The plurality of vBNG instances are configured to receive requests to access service provider services from the one or more subscriber devices and to selectively authenticate the one or more subscriber devices based on authentication information included in the requests to access services provider services. The one or more core applications are operable by the one or more processors. The one or more core applications include a network instance and configuration manager (NICM) configured to modify the vBNG instance information to include an additional vBNG instance to be added to the plurality of vBNG instances and to output, to an edge router of the one or more edge routers, an instruction to generate the additional vBNG instance at the edge router.

In some examples, a method for managing subscriber logins for network subscribers includes storing, by one or more NSDB of a BNG controller, vBNG instance information for one or more subscriber devices, the vBNG instance information specifying a plurality of vBNG instances operable by one or more edge routers. The plurality of vBNG instances are configured to receive requests to access service provider services from the one or more subscriber devices and to selectively authenticate the one or more subscriber devices based on authentication information included in the requests to access services provider services. The method includes modifying, by a NICM operable by one or more processors of the BNG controller, the vBNG instance information to include an additional vBNG instance to be added to the plurality of vBNG instances and outputting, by the NICM, to an edge router of the one or more edge routers, an instruction to generate the additional vBNG instance at the edge router.

In some examples, an edge router includes a memory, one or more processors in communication with the memory, a BNG virtual machine manager, and one or more vBNG instances. The BNG virtual machine manager is operable by the one or more processors and configured to receive, from a BNG controller, an instruction to generate a vBNG instance and, in response to the instruction, generate the vBNG instance to provision one or more vBNG instances at the edge router. The one or more vBNG instances are operable by the one or more processors and configured to receive a request to access service provider services from one or more subscriber devices, and selectively authenticate the one or more subscriber devices based on authentication information included in the requests to access services provider services.

In some examples, a method includes receiving, by a BNG virtual machine manager operable by one or more processors of an edge router, from a BNG controller, an instruction to generate a vBNG instance and generating, by the BNG virtual machine manager, the vBNG instance at the edge router to provision one or more vBNG instances operable by the one or more processors in response to the instruction. The method further includes receiving, by the one or more vBNG instances operable by the one or more processors, a request to access service provider services from one or more subscriber devices and selectively authenticating, by the one or more vBNG instances, the one or more subscriber devices based on authentication information included in the requests to access services provider services.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
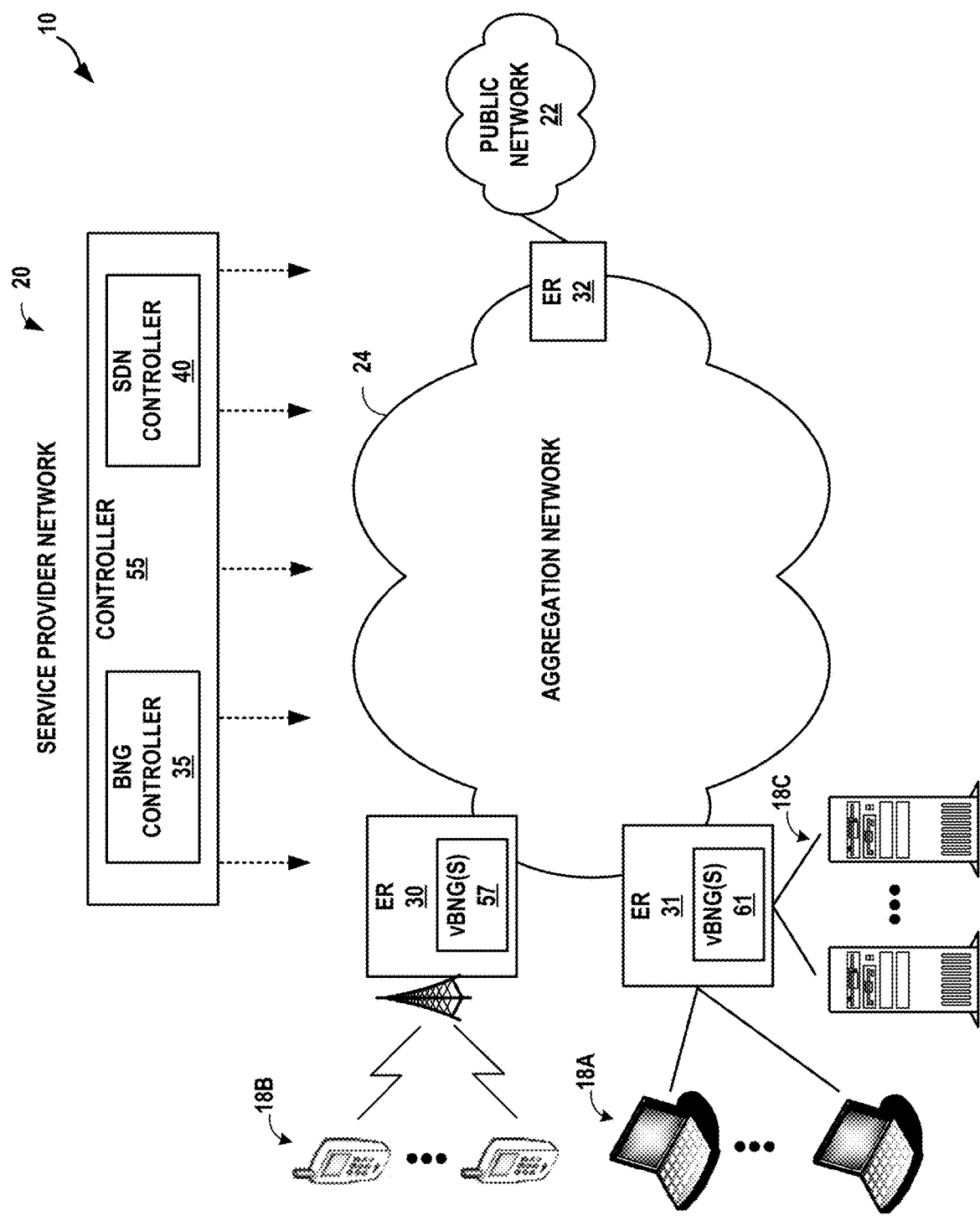
FIG. 1 is a block diagram illustrating an example network system in accordance with techniques described herein.

The virtualized broadband network gateway (vBNG) may be an important network function for network operators and service providers (SPs) offering retail and wholesale services as a cloud deployment. As used herein, cloud may refer to a group of networked elements that provide services, more specifically, for example, a group of networked elements that share computational resources for processing tasks of multiple users. The vBNG may enable a fast rollout of new services and a new capacity in centralized data centers (DC) or near central office (CO).

The vBNG may be applicable when service providers deploy a distributed architecture with a large number of micro data centers near an edge of their network. Decentralized network designs may facilitate deployment of vBNG services and functions in a cost effective manner and close to the network edge. Depending on the scale required, customers may choose between a physical or virtual deployment.

In order to provide cloud based service delivery, some systems may use a vBNG, which is a virtualized network function (VNF) for subscriber management and services at the edge. Deployment of vBNGs may allow network service providers to elastically scale capacity in distributed edge or centralized data centers.

Scaling numbers and call setup rate (CSR) for vBNG may be significantly less compared to the physical BNGs. Customers may deploy multiple vBNG instances to achieve intended scale. However, there is a need to manage the vBNG instances due, in part, to less capacity. As a number of vBNG instances grows, so does the difficulty in managing the larger number of vBNGs.

Service providers deploying vBNGs frequently face challenges especially with respect to scale and call setup rate for a single vBNG. Service providers face challenges to manually deploy additional vBNG in order to meet the requirements and manage so many vBNG instances in the cloud. Usually, there is no compounding of vBNGs or communication between vBNGs. Further, physical BNGs and vBNGs may result in security issues, which is important to service providers. Such security issues may be difficult to manage by systems that use numerous distributed vBNGs.

Because, in some systems, all the vBNG instances are owned by the service provider, one or more techniques described herein may utilize the elasticity of the vBNG. This disclosure describes an application suite, which may be deployed in the cloud as a software as a service (SaaS) model. This application suite may manage multiple vBNG instances in the cloud and interact to present as one consolidated vBNG. This consolidated vBNG may allow for flexibility in terms of expanding and contracting dynamically in response to evolving network conditions. One or more techniques described herein may offer automation to provide different services like managing multiple vBNG instances, centralized subscriber database, load balancing, high availability, subscriber analytics, unified security management, configuration management, and other benefits that potentially improve operation of the network itself.

One or more techniques described herein may provide an end-to-end solution for deployment, expansion, growth and management of a BNG network (including one or both of physical BNGs and vBNG instances (also referred to a "BNG instances"), in the form of one or more applications which can be deployed in the cloud (referring generally to network provided services managed and maintained by the service provider network). One or more techniques described herein may reduce costs for service providers, as management may be centralized thereby saving costs associating with on-site management of a distributed network of physical BNGs.

FIG. 1 is a block diagram illustrating an example network system 10 in accordance with techniques described herein. As shown in the example of FIG. 1, network system 10 includes a service provider network 20 coupled to a public network 22. Service provider network 20 operates as a private network that provides packet-based network services to subscriber devices 18A, 18B, 18C (collectively, "subscriber devices 18").

The elements of network system 10 may support any one or more of a variety of protocols, such as Internet Protocol (IP), Frame Relay, Asynchronous Transfer Mode (ATM), Ethernet, Point-to-Point Protocol (PPP), Point-to-Point Protocol over Ethernet (PPPoE), GPRS tunneling protocol (GTP), Dynamic Host Configuration Protocol (DHCP), Layer 2 Tunneling Protocol (L2TP), and virtual local area network (VLAN)-related protocols, among others. Using any one or more of these protocols, any of subscriber devices 18 may present authentication credentials to edge routers 30-32 to request access to a service provider network 20 service. For example, subscriber device 18A may broadcast credentials, such as a username and password, to edge router 30 to request access to a service provided by service provider network 20. Subscriber devices 18 may broadcast credentials using, for instance, a PPPoE Active Discovery Initiation (PADI) packet to edge routers 30-32.

Service provider network 20 supports one or more packet-based services that are available for request and use by subscriber devices 18. As examples, service provider network 20 may provide Internet access, bulk data delivery, voice over Internet protocol (VoIP), Internet protocol television (IPTV), short messaging service (SMS), wireless application protocol (WAP) service, telnet, or customer-specific application services. Service provider network 20 may include, for instance, a local area network (LAN), a wide area network (WAN), a virtual LAN (VLAN), an enterprise LAN, a layer 3 virtual private network (VPN), an Internet protocol (IP) intranet operated by a network service provider that also operates access aggregation network 24, an enterprise IP network, or some combination thereof. In various examples, service provider network 20 may be connected to or form part of one or more of a public WAN, the Internet, or to other networks. Service provider network 20 executes one or more packet data protocols (PDPs), such as IP (IPv4 and/or IPv6), X.25 or point-to-point protocol (PPP), to enable packet-based transport of service provider network 20 services.

Subscriber devices 18A may include, for example, personal computers, laptop computers and/or other types of computing device associated with subscribers. Subscriber devices 18B may comprise, for example, mobile telephones, laptop or desktop computers having, e.g., a 3G wireless card, wireless-capable netbooks, video game devices, pagers, smart phones, personal data assistants (PDAs) or the like. Subscriber devices 18C may include, for example, a workstation, desktop computer, server computer, server farm, server cluster, or any other device or group of devices that are capable of accessing a computer network via a wireless and/or wired connection. Each of subscriber devices 18 may be associated with a subscriber (e.g., a human, an enterprise, etc.). Applications that access services provided by service provider network 20 may alternatively be referred to as "user agents." In this example, any of subscriber devices 18 may connect to at least one of edge routers 30-32 in order to access service provider network 20.

Edge routers (ERs) 30-32 operate at the borders of aggregation network 24 and, responsive to controller 55, apply network services, such as authorization, policy provisioning, and network connectivity, to network traffic associated with subscriber devices 18 in communication with edge routers 30-32. Edge routers 30-32 may include one or more processors (not shown in FIG. 1 and which may include a central processing unit—CPU) that execute software instructions, such as those used to define a software or computer program, stored to a computer-readable storage medium (again, not shown in FIG. 1), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. In some examples, edge routers 30-32 may comprise a processor in the form of dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Although FIG. 1 illustrates one edge router 30, as discussed further in FIG. 2, edge router 30 may represent any quantity of edge routers. Similarly, edge router 31 may represent any quantity of edge routers.

In the example of FIG. 1, for ease of explanation, service provider network 20 is shown having three edge routers 30-32, although the service provider network may typically service thousands or tens of thousands of edge routers. For example, edge router 30 may represent a mobile gateway, for example, a gateway general packet radio service (GPRS) serving node (GGSN), an access gateway (aGW), or a packet gateway (P-GW). Edge routers 30-32 may include a plurality of service virtual LANs (SVLANs) that partition elements of access network (e.g., DSLAMs) into logically different networks. Different subscriber devices 18 may therefore connect to edge routers 30-32 using different SVLANs.

As shown in FIG. 1, service provider network 20 may provide subscriber devices 18B with access to aggregation network 24 via radio signals. For example, edge router 30 may be connected to one or more wireless radios or base stations to wirelessly exchange packetized data with subscriber devices 18B. The packetized data may then be communicated through aggregation network 24 of the service provider and ultimately to public network 22.

Aggregation network 24 provides session management, mobility management, and transport services to support access, by subscriber devices 18, to public network 22. Edge routers 30-32 provide an anchor point of active sessions for subscriber devices 18. Edge routers 30-32 may maintain session data and operate as a termination point for communication sessions established with subscriber devices 18 that are currently accessing packet-based services of public network 22 via aggregation network 24.

Aggregation network 24 provides transport services for network traffic associated with subscriber devices 18. Aggregation network 24 may include internal routers and switches that provide transport services between edge routers 30-32. After authentication and establishment of network access through edge routers 30-32, any one of subscriber devices 18 may begin exchanging data packets with public network 22 with such packets traversing aggregation network 24. Although not shown, aggregation network may include devices to provide security services, load balancing, billing, deep-packet inspection (DPI), and other services for mobile traffic traversing aggregation network 24.

Aggregation network 24 may, for example, include one or more network devices (e.g., aggregation nodes) configured to operate as label switched routers (LSRs) that forward traffic along transport label switched paths (LSPs) defined within aggregation network 24. Edge routers 30-32 may operate as endpoints for the LSPs to map subscriber traffic into and out of the LSPs. For example, edge routers 30-32 may map network services to individual LSPs within aggregation network 24. In the example of FIG. 1, controller 55 includes Software Defined Network (SDN) controller 40, which traffic engineers the LSPs through aggregation network 24 according to the bandwidth, quality of Service (QoS) and availability requirements of network services applications, as further described below. In some examples, SDN controller 40 may be omitted.

In the example of FIG. 1, controller 55 includes a BNG controller 35 that elastically provisions one or more vBNG instances 57 on edge router 30 and/or one or more vBNG instances 61 on edge router 31 to satisfy subscriber demand from subscriber devices 18. Controller 55 may include one or more processors (not shown in FIG. 1 and which may refer to, as one example, a central processing unit—CPU) that execute software instructions, such as those used to define a software or computer program, stored to a computer-readable storage medium (again, not shown in FIG. 1), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. In some examples, controller 55 may comprise a processor in the form of a dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

As used herein, a vBNG instance may refer to software configured on a device or component (e.g., board or service card) that provides access to service provider network 20. A vBNG instance may also be referred to as a "virtual BNG" ("vBNG") or a "vBNG instance." For example, a vBNG instance may represent and/or incorporate a software instance provisioned on a network access server to provide dial-up or virtual private network (VPN) services to an enterprise LAN, a remote access server (e.g., broadband remote access server) or broadband services router that aggregates outputs from one or more digital subscriber line access multiplexers (DSLAMs) into a higher-speed uplink to service provider network 20, a wireless access point (WAP) providing wireless physical layer access to service provider network 20, or switches that use other LAN-based (e.g., Ethernet) technologies to provide wired physical layer access to service provider network 20.

A vBNG instance may manage authentication, authorization, and accounting (AAA) functionality for networks that offer services to one or more subscribers. The protocol most commonly used by the servers to communicate with clients is the remote authentication dial in user service (RADIUS) protocol. The RADIUS protocol is described in Carl Rigney et al., "Remote Authentication Dial In User Server (RADIUS)," Network Working Group of the Internet Engineering Task Force (IETF), Request for Comments 2865, June 2000, which is incorporated by reference herein in its entirety (referred to hereinafter as "RFC 2865"). Additionally, a vBNG instance may terminate network subscribers by authenticating to provide subscriber services such as, but not limited to, for example, an Internet connection, a firewall, a class of service (CoS), or another subscriber service.

In accordance with one or more techniques described in this disclosure, BNG controller 35 may store vBNG instance information for subscriber devices 18. The vBNG instance information may indicate vBNG instances (e.g., vBNG instances 57, 61, etc.) operable by one or more edge routers (e.g., edge routers 30-32) and configured to receive requests to access service provider services from subscriber devices 18 and authenticate respective requests to access service provider services (e.g., service provider network 20).

vBNG instances 57 may receive a request to access service provider services from subscriber devices 18, and authenticate respective requests to access service provider services. In this example, vBNG instances 57 may advertise subscriber information to BNG controller 35. For instance, vBNG instances 57 may increment a login count and send an updated login count at a predetermined time interval (e.g., every 'n' seconds). In some instances, vBNG instances 57 may increment inflight information (e.g., inflight login, inflight logout, etc.) and send updated inflight information at a predetermined time interval (e.g., every 'n' seconds). As used herein, an inflight login may refer to subscriber logins, service attachments during login, or the like that are in process by vBNG instances 57. For example, an inflight login may include instances when a subscriber is logging in to authenticate, attach services, and the like. As such, inflight login may refer to a time period between when a subscriber is attempting to login to when the subscriber has completed a login process. Similarly, an inflight logout may refer to subscriber logouts, service detachments, or the like during logout that are in process by vBNG instances 57. As such, inflight logout may refer to a time period between when a subscriber is attempting to logout to when the subscriber has completed a logout process.

BNG controller 35 may recompute load balancing for the plurality of vBNG instances. In this example, in response to determining that resources (e.g., central processing unit (CPU), queues, resources busy, resources full, etc.) of the vBNG instances 57, 61 are at or near a capacity, BNG controller 35 may output, to an edge router (e.g., edge router 30, 31), an instruction to instantiate an additional vBNG instance. That is, for example, BNG controller 35 may output, to vBNG instances 57 and/or vBNG instances 61, load balancing credit information. In this example, each of vBNG instances 57 and/or vBNG instances 61 may receive the load balancer information from BNG controller 35. Further, in some examples, BNG controller 35 may balance inflight login/logouts.

Edge router 30 may receive, from BNG controller 35, the instruction to generate an additional vBNG instance and, in response to the instruction, generate an additional vBNG instance at edge router 30. BNG controller 35 may recompute load balancing for the additional vBNG instance and the plurality of vBNG instances. In this example, BNG controller 35 may output a load balancer credit to the additional vBNG instance. In this example, edge router 30 may receive, from BNG controller 35, load balancing credit information. As such, edge router 30 may authenticate requests to access service provider services based on the load balancing credit information.

In this way, BNG controller 35 and edge router 30 may elastically increase or decrease vBNG instances. Elastically increasing or decreasing vBNG instances may improve an operation of network system 10. For instance, elastically increasing and decreasing vBNG instances may permit network system 10 to use less power when a demand for BNG services is low compared to network systems that do not elastically increases or decrease vBNG instances. In another instance, elastically increasing and decreasing vBNG instances may permit network system 10 to support all requested BNG processes when a demand for BNG services is high compared to network systems that do not elastically increases or decrease vBNG instances. Although the above examples use edge router 30 as a BNG, other examples may use edge router 31 as a BNG.

Figure 2:
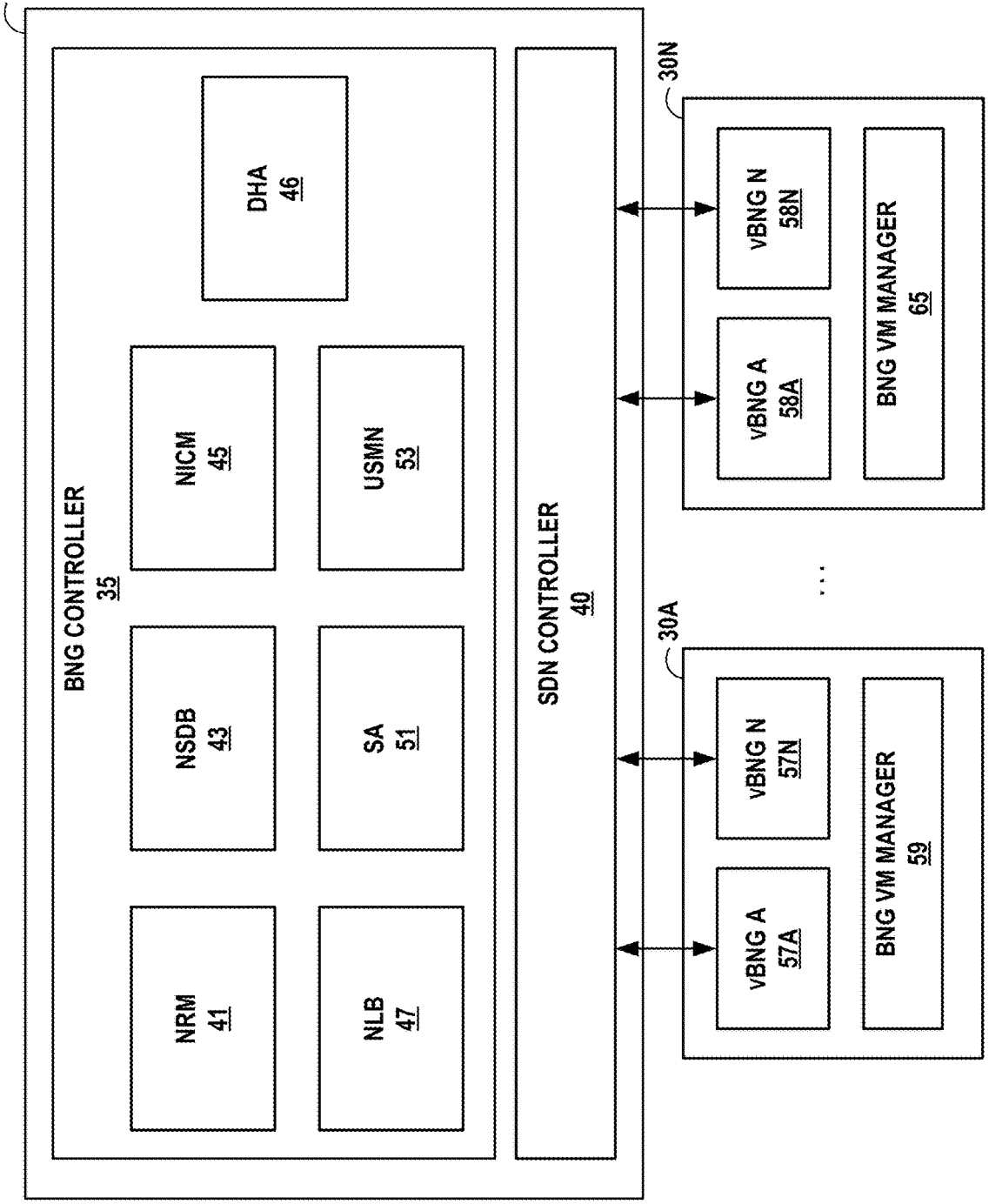
FIG. 2 is a block diagram illustrating an example broadband network gateway (BNG) controller in accordance with techniques described herein.

FIG. 2 is a block diagram illustrating an example BNG controller 35 in accordance with techniques described herein. BNG controller 35 and optionally SDN controller 40 may be implemented as controller 55, which may be implemented on one or more devices running in a cloud (which is a network of the one or more devices that operate in support of the controller 55 services described below in more detail). For example, BNG controller 35 may be implemented in one or more applications executed at a centralized computing device (e.g., a computer, server, laptop, etc.). In some examples, BNG controller 35 may be implemented in one or more applications executed at a plurality of networked computing elements (e.g., a cloud, server cluster, etc.).

Edge routers 30A-30N (collectively, "one or more edge routers 30" or simply "edge router 30") may include any suitable number of virtual BNG (vBNG) instances. For example, edge router 30A may include virtual vBNG instances (vBNG) 57A-vBNG 57N (collectively, vBNG instances 57). Additionally, edge router 30A may include BNG virtual machine manager 59 configured to provision (or, in other words, activate) one or more of vBNG instances 57 and/or to delete (or, in other words, deactivate) one or more of vBNG instances 57. For instance, edge router 30A may include a hypervisor or virtual machine monitor (VMM) or virtual machine manager (VMM) configured to provision (or, in other words, activate) one or more of vBNG instances 57 and/or to delete (or, in other words, deactivate) one or more of vBNG instances 57. Similarly, edge router 30N may include virtual vBNG instances (vBNG) 58A-vBNG 58N (collectively, vBNG instances 58). For instance, edge router 30N may include a hypervisor or virtual machine monitor (VMM) configured to provision (or, in other words, activate) one or more of vBNG instances 58 and/or to delete (or, in other words, deactivate) one or more of vBNG instances 58. Additionally, edge router 30N may include BNG virtual machine manager 65 configured to provision one or more of vBNG instances 58 and/or to delete one or more of vBNG instances 58.

In the example of FIG. 2, vBNG instances 57 may be substantially similar to vBNG instances 58 and BNG virtual machine manager 59 is substantially similar to BNG virtual machine manager 65, however, in other examples, vBNG instances 57 and 58 and/or BNG virtual machine managers 59 and 65 may be different. Although the example of FIG. 2 illustrates virtual vBNG instances (e.g., vBNG A 57A-vBNG N 57N, vBNG A 58A-vBNG N 58N) as being included in edge router 30, in some examples, virtual vBNG instances may be included in other edge routers of edge routers 30-32.

As shown, BNG controller 35 may include network resource manager (NRM) 41 ("NRM 41"), network subscriber database (NSDB) 43 ("NSDB 43"), network instance and configuration manager (NICM) 45 ("NICM 45"), dynamic high availability (DHA) 46 ("DHA 46"), network load balancer (NLB) 47 ("NLB 47"), subscriber analytics (SA) unit 51 ("SA 51"), and unified network security management (USMN) unit 53 ("USMN 53").

NRM 41 may actively monitor resources across vBNG instances 57 and 58. NRM 41 may monitor both BNG aspects and system resource aspects of each vBNG instance of vBNG instances 57 and 58. NRM 41 may monitor BNG aspects such as a number of subscribers and services for the subscribers, IPv4/IPv6 address pools, a usage of IPv4/IPv6 address pools, quality of service, queues and schedulers, cache (e.g., L1) resources, business services, and/or calls per second (CPS) at each vBNG instance of vBNG instances 57 and 58. NRM 41 may monitor system resource aspects such as CPU availability, memory, bandwidth, control packet response times, inflight login/logouts (e.g., event rate analyzer), critical management queues, and other system resource aspects. Thus, NRM 41 may be "aware" of not only subscriber related resources but also system resources. NRM 41 may also monitor health of each of vBNG instance of vBNG instances 57 and 58.

NSDB 43 may store a subscriber database for accessing service provider network 20. With the access to each of vBNG of vBNG instances 57 and 58, the entire network subscriber database may be maintained at a centralized place. Subscriber databases of individual vBNG instances may be available at individual vBNG instances. NSDB 43 may have a transaction update mechanism from the individual vBNG subscriber database. NSDB 43 may be in lock-sync with the subscriber database of individual vBNG. For example, NSDB 43 and each vBNG of vBNG instances 57 and 58 may be configured to synchronize a local database (e.g., memory of one of edge routers 30-32) of each respective vBNG with NSDB 43. Service providers may have a subscriber database for the entire network (e.g., service provider network 20) at one single place.

With the subscriber data correlation being centralized, BNG controller 35 may perform more granular subscriber management, allowing for more detailed and comprehensive subscriber management compared to subscriber management performed with respect to decentralized subscriber data. Subscriber data correlation may be useful and helpful for many new applications, for example, but not limited to, when one of the vBNG instances ceases operation. With NSDB 43, BNG controller 35 may instantiate a new vBNG instance with little or no delay relative to manually provisioning a physical BNG, while also potentially recovering all the subscribers upon provisioning the new vBNG instance. NSDB 43 may provide the functionality of vBNG restart. NSDB 43 may include one or more databases, and may be implemented in a cloud using multiple server devices. For example, multiple networked elements may store NSDB 43.

In some examples, NSDB 43 may store subscriber colocation information. For example, a user may log-in at home, then login on a mobile device, and then log-in at an office. By storing subscriber colocation information, BNG controller 35 may determine, for example, how much time the particular user takes to drive between the office and home. BNG controller 35 (e.g., NRM 41) may instantiate a new vBNG instance based on the subscriber colocation information. For instance, NRM 41 may instantiate a new vBNG instance to support a subscriber login on a mobile device when the particular user drives between the office and home. In some examples, NSDB 43 may include BNG specific information. Examples of BNG specific information may include, but are not limited to, for example, subscriber count, inflight logins, inflight logouts, resources, or other BNG specific information.

NICM 45 may create and/or delete a vBNG instance (e.g., vBNG instances 57 and 58) as per the need and directive from the NRM 41 and/or NLB 47. Because vBNG instances 57 and 58 may promote a pay as you grow model, customers (e.g., service providers) may optimize cost by instantiating vBNG instances only when needed and de-instantiating vBNG instances dynamically. This need-based deployment may reduce the costs associated with subscriber management for service providers. Need-based deployment may make the network itself (e.g., network system 10) more efficient by reducing needless execution of vBNG processes, saving processor cycles, bandwidth, and memory consumption, which promotes reduced power consumption.

In some examples, NICM 45 may create a new vBNG instance when the existing instances are within a threshold amount of supported subscriber capacity, a login rate is higher than the calls per second (CPS) handled by the existing instances, and/or an existing vBNG instance has ceased. Similarly, when the existing instances are less than a threshold amount of subscriber capacity, and/or a login rate for an existing vBNG instance is less than a threshold calls per second (CPS), NICM 45 may bring down (or, in other words, delete or deactivate) the particular vBNG and reduce costs for customers. Creating a new vBNG instance or deactivating existing vBNG instances may improve an operation of a network system (e.g., network system 10 of FIG. 1) and is cost effective. For instance, deactivating existing vBNG instances may permit network system 10 to use less power when a demand for BNG services is low compared to network systems that do not elastically increases or decrease vBNG instances, saving the cost for service providers. In another instance, creating a new vBNG instance may permit network system 10 to support all requested BNG processes when a demand for BNG services is high compared to network systems that do not elastically increases or decrease vBNG instances.

Regarding the configuration portion of NICM 45, traditionally, some router configurations may be applied through a command line interface (CLI), Extensible Markup Language (XML), YAML, or another interface that relies on user intervention. However, NICM 45 may maintain configuration templates for each of vBNG instance of vBNG instances such that the configurations may be replicated automatically without any user intervention. That is, for example, each vBNG instance of vBNG instances 57 and 58 may be configured to receive configuration updates from BNG controller 35, such as, for example, but not limited to, a configuration template.

Whenever NICM 45 spawns a new vBNG instance, the configuration for the new vBNG instance may be created from the template and pushed to the vBNG instance. NICM may push and/or publish configuration updates to all vBNG instances without user intervention.

NICM 45 may configure replication policies configured for stanzas such that any configuration change learned dynamically from any of the vBNG instances may be replicated to the remaining vBNG instances, e.g. if security threat or suspicious flow detected at one of vBNG instance, a solution to the security threat or suspicious flow may be templated and pushed to rest of the vBNG instances without any user intervention.

NLB 47 may load balance vBNG instances 57 and 58. Optimal use of resources may be possible only when load is balanced at vBNG instances 57 and 58. Load balancing on any particular vBNG instance may be limited. In order to effectively balance the load across vBNG instances, NLB 47 may perform load balancing outside the instance, at a centralized place like BNG Controller 35. NLB 47 may spread the load of new incoming subscribers across different vBNG instances. Additionally, or alternatively, NLB 47 may spawn a new vBNG instance if incoming load is too much to handle. Load balancing outside the instance may make the network itself (e.g., network system 10) more efficient by reducing needless execution of vBNG processes, saving processor cycles, bandwidth, and memory consumption, which promotes reduced power consumption. Thus, NLB 47 may optimize load across the network from a centralized place (e.g., BNG Controller 35) rather than each vBNG optimizing load at a respective vBNG.

NRM 41 may be aware of subscriber related resource utilization (e.g. number of subscribers, quality of service, queues, IPv4/IPv6 address pools, a usage of IPv4/IPv6 address pools, loss interference (LI), business services, or other subscriber related resource utilization) as well as the system resource utilization like (call setup rate, inflight login/logouts, CPU, memory, bandwidth, or other system resource utilization). NRM 41 may balance the load among all the vBNG instances. NRM 41 may divert the load of new incoming subscribers across different vBNG instances, balancing the load across the entire network. Based on subscriber related resource utilization, NRM 41 may create the new instance of vBNG by triggering NICM 45. For instance, NRM 41 may create the new instance of vBNG by triggering NICM 45 when a number of subscribers exceeds a threshold for existing vBNG instances.

Various aspects of the techniques may also provide for Dynamic High Availability (DHA). Customers may request high availability (HA) for subscribers. Deploying two chassis and creating a physical setup may be relatively expensive. Further, a physical setup may be indefinite. There may be a need for time-based HA e.g. only during working hours or may not be needed on weekends. There may be HA needed during maintenance window only. Still it's necessary for the customers to purchase the expensive redundant hardware and deploy permanently. DHA 46 may allow customers to configure redundancy policy depending upon their network requirement. DHA 46 may dynamically spawn and/or collapse instances of vBNG together with NICM 45 and configure HA, completely based on the configured redundancy policy. For instance, DHA 46 may dynamically collapse one or more vBNG instances of vBNG instances 57 and 58. In some examples, DHA 46 may dynamically spawn one or more additional vBNG instances to be added to vBNG instances 57 and 58. NICM 45 may dynamically create a new instance of vBNG. When such a need does not exist anymore, NICM 45 may remove the vBNG instance. DHA 46 may make the network itself (e.g., network system 10) more efficient by reducing needless execution of redundant physical setups, which promotes reduced power consumption.

NRM 41 may monitor the health of each of the vBNG instances. When NRM 41 detects that an instance of vBNG is no longer functioning as provisioned, NRM 41 may inform NICM 45 to create a new instance of vBNG and restore subscribers with the subscriber data from NSDB 43. As such, NRM 41 may help to provide the functionality of vBNG restart.

SA 51 may collect subscriber data and information for the entire network. Said differently, SA 51 may receive analytics data from at least one of vBNG instances 57 and 58. In this example, SA 51 may generate subscriber behavior data based on the analytics data for operating vBNG instances 57 and 58. New applications can emerge if real-time subscriber data and information for the entire network is available in a centralized location. For example, subscriber behavior may be based on weekends or holidays on a particular part of the world or subscriber behavior may be based on a sporting event (e.g. super bowl). Based on the analytics collected by SA 51, the service providers may pre-plan a number of required vBNG instances in a particular data center. Additionally, SA 51 may correlate and apply analytics centrally across vBNG instances. In some examples, SA 51 may perform machine learning using data from one vBNG instance and form auto-templates to be distributed globally to other vBNG instances. Collecting subscriber data and information for the entire network may make the network itself (e.g., network system 10) more efficient by reducing needless execution of vBNG processes, saving processor cycles, bandwidth, and memory consumption, which promotes reduced power consumption.

UNSM 53 may manage network wide distributed denial-of-service (DDoS) detection and protection. In some systems, security is considered only at the vBNG instance level. Network-level management of DDoS detection may help to truly mitigating the DDoS attack. In the example of FIG. 2, the security of the entire network may be considered at one centralized place, for instance, UNSM 53. With the data available for the entire network, UNSM 53 may correlate data for mitigating the DDoS attack. UNSM 53 may perform one or more functions of an Intrusion Detection System (IDS) by correlating the security data across the vBNG instances. UNSM 53 may identify suspicious flow at the entire network level and may apply security threat and mitigation techniques across the vBNG instances. UNSM 53 may identify a security threat from one vBNG instance and apply mitigation automatically across all vBNG instances. For example, UNSM 53 may exchange (e.g., receive and/or output) security related information with each vBNG instance of vBNG instances 57 and 58.

Examples of security related information may include, but are not limited to, for example: (1) a configuration template indicating a security configuration profile which is generated by UNSM 53 to indicate one or more malware programs identified by a physical BNG and/or vBNG that are to be denied download or open access; (2) a configuration template indicating a security configuration profile which is generated by UNSM 53 to indicate one or more threatening re-direct sites identified by a physical BNG and/or a vBNG that are to be quarantined; (3) a configuration template indicating a security configuration profile which is generated by UNSM 53 to indicate one or more sites identified by a physical BNG and/or a vBNG to be quarantined; (4) a configuration template indicating a security configuration profile which is generated by UNSM 53 to indicate ransomeware sites identified by a physical BNG and/or a vBNG to be quarantined; and (5) a configuration template indicating a security configuration profile which is generated by UNSM 53 to indicate traffic that is tapped through LI (Lawful Intercept). Such collected UNSM data may be run through artificial intelligence. In some examples, such collected UNSM data may be used by data science to identify criminal activities.

For example, UNSM 53 may receive network security data from vBNG instances 57 and 58. In this example, UNSM 53 may analyze received network security data to generate one or more alerts. As used herein, one or more alerts that may be generated by UNSM 53 may refer to informing a human administrator and/or operator. For example, an alert may include, a syslog, pop-up, or another alert. In this example, UNSM 53 may configure vBNG instances 57 and 58 based on the network security data. For instance, UNSM 53 may exchange (e.g., receive and/or output) security related information with each vBNG instance of vBNG instances 57 and 58 as discussed above. In some examples, UNSM 53 may output, to each vBNG instance of vBNG instances 57 and 58, updates. In this example, each vBNG instance of vBNG instances 57 and 58 may receive updates from UNSM 53 of BNG controller 35.

In accordance with one or more techniques described herein, NSDB 43 stores vBNG instance information for one or more subscriber devices. The vBNG instance information may specify vBNG instances 57 and vBNG instances 58A-58M. NICM 45 modifies the vBNG instance information to include an additional vBNG instance to be added to vBNG instances 57 and 58. For example, NICM 45 may add vBNG instance 58N to vBNG instances 57 and vBNG instances 58A-58M. NICM 45 outputs an instruction to generate vBNG instance 58N at edge router 30N.

In response to receiving the instruction to generate vBNG instance 58N at edge router 30N, BNG virtual machine manager 65 generates vBNG instance 58N at edge router 30N to provision vBNG instances 58. In response to receiving a request to access service provider services from subscriber devices 18A and 18B of FIG. 1, vBNG instances 58 may selectively authenticate subscriber devices 18A and 18B based on authentication information included in the requests to access services provider services and may provide subscriber services such as, but not limited to, for example, an Internet connection, a firewall, a class of service (CoS), or another subscriber service.

The example of FIG. 2 may provide the following advantages compared to systems that do not dynamically instantiate vBNG instances. For example, one or more techniques described herein may provide an end-to-end solution for deployment, expansion, growth and management of edge (network subscribers), in the form of application which can be deployed in cloud. Such techniques may hide the complexity of deployment and day-to-day operations of numerous vBNG instances to a single centralized node. Such automation may help to remove admin/user intervention, to a great extent. In some examples, one or more techniques described herein may elastically increase/decrease vBNG instances, which may make the network itself (e.g., network system 10) more efficient by reducing needless execution of vBNG processes, saving processor cycles, bandwidth, and memory consumption, which promotes reduced power consumption. In some examples, one or more techniques described herein may provide automatic management and compounding solution for multiple vBNG instances. In some examples, one or more techniques described herein may provide a cost effective approach for service providers. In some examples, one or more techniques described herein may provide easy to deploy, easy to expand, agility for deploying new services. In some examples, one or more techniques described herein may provide, due in part to elasticity, an unlimited amount of scale, call setup rate, and/or resources. In some examples, one or more techniques described herein may provide an optimal use of resources with load balancing across the vBNG instances reduces the operational expenses (OPEX), which may make the network itself (e.g., network system 10) more efficient by reducing needless execution of vBNG processes, saving processor cycles, bandwidth, and memory consumption, which promotes reduced power consumption. In some examples, one or more techniques described herein may help to provide no network downtime. In some examples, one or more techniques described herein may provide automatic recovery of vBNG instance. In some examples, one or more techniques described herein may provide unified security and threat management. In some examples, one or more techniques described herein may provide intrusion detection and unified suspicious flow detection.

Although FIG. 2 described BNG controller 35 in operation with virtual vBNG instances, in some examples, BNG controller 35 may operate with physical BNGs or a combination of physical BNGs and virtual vBNG instances. For example, NRM 41 may actively monitor resources across physical BNGs. In some examples, NLB 47 may load balance physical BNGs. In some examples, NRM 41 may be aware of subscriber related resource utilization of physical BNGs. In some examples, NRM 41 may monitor the health of each physical BNG. In some examples, SA 51 may collect subscriber data and information for physical BNGs. For example, UNSM 53 may manage network wide distributed denial-of-service (DDoS) detection and protection for physical BNGs.

Figure 3:
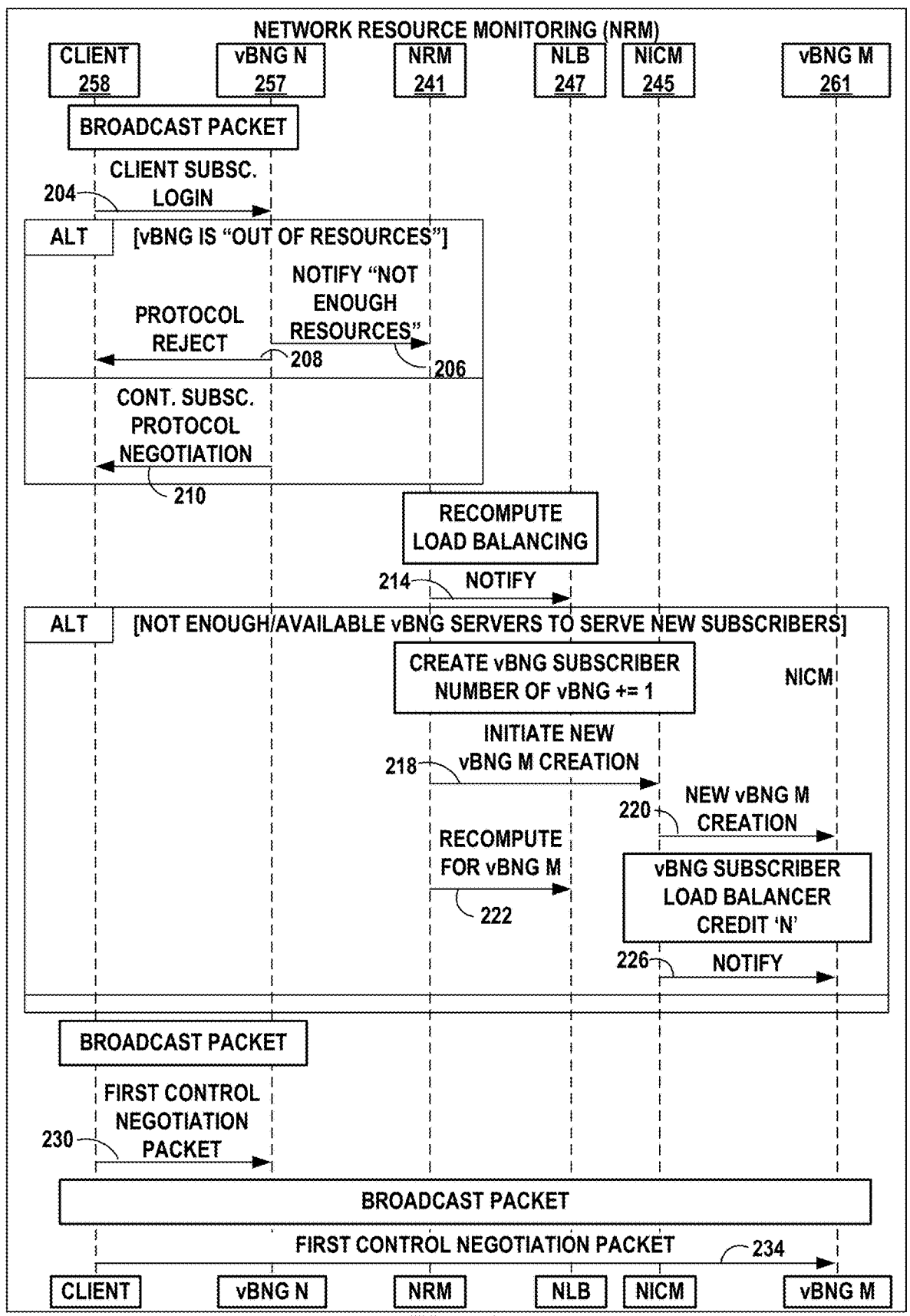
FIG. 3 is a sequence diagram illustrating an example network resource monitoring process in accordance with techniques described herein.

FIG. 3 is a sequence diagram illustrating an example network resource monitoring process in accordance with techniques described herein. FIG. 3 illustrates an exemplary use case describing how an "out of resources" condition local to a vBNG is communicated to NRM 41 which could result in creation of a new vBNG guest instance. FIG. 3 is discussed with respect to FIG. 1 and FIG. 2 for exemplary purposes only. Client 258 may be an example of subscriber device 18A of FIG. 1. vBNG N 257 may be an example of vBNG N 57N of FIG. 2. vBNG M 261 may be an example of vBNG N 61N of FIG. 2. NRM 241 may be an example of NRM 41 of FIG. 2. NLB 247 may be an example of NLB 47 of FIG. 2. NICM 245 may be an example of NICM 45 of FIG. 2.

In the example of FIG. 3, all the vBNG instances are running at close to full capacity. That is, for example, the existing vBNG instances are running out of resources and/or the number of subscribers logged in are nearing the capacity of the vBNG instances. In such instances, an administrator may want to spawn a new instance of vBNG to take up the new subscribers. In the example of FIG. 3, instead of manually creating the guest instance and then adding configuration, BNG controller 35 may dynamically create a guest instance and then adding a configuration for the guest instance. That is, for example, NRM 241 may be configured to determine a capacity and action based on the percentage of usage and, if the configured action is to create guest instance, NRM 241 may trigger NICM 245 to create a new instance as described in the following.

Initially, client 258 outputs broadcasts packet and a client subscriber login (204). In the example of FIG. 3, vBNG N 257 has an "out of resources" condition. For example, vBNG N 257 may lack CPU availability, memory, bandwidth, control packet response times, inflight login/logouts (e.g., event rate analyzer), critical management queues, and other system resource aspects.

In response to the out of resources condition, vBNG N 257 notifies NRM 241 that there are not enough resources (206) and outputs a protocol reject to client 258 (208) and the process proceeds to 214. Said differently, for example, vBNG N 257 may output a notification to NRM 241 indicating a lack of computational resources and may output a rejection message to client 258. In response, however, to vBNG N 257 having sufficient resources, vBNG N 257 may continue the subscriber protocol negotiation (210).

In response to receiving the notification of insufficient resources, NRM 241 outputs, to NLB 247, a notification for recomputing load balancing in response to receiving the notification of insufficient resources. For instance, NRM 241 causes NLB 247 to recompute load balancing and outputs a notification to NLB 247 (214).

In response to determining that there are not available vBNG instances to serve new subscribers, NRM 241 may output, to NICM 245, a request to generate vBNG M 261 for reducing a load at vBNG N 257. For instance, NRM 241 may cause NICM 245 to create vBNG M 261 such that the number of vBNGs increases by one (218). NICM 245 creates vBNG M 261 (220). NRM 241 outputs a request for NLB 247 to recompute load information for vBNG M 261 (222). For instance, NRM 241 outputs, to NLB 247, an instruction to recompute load balancing for vBNG M 261. NLB 247 outputs a vBNG subscriber load balancer credit 'n' to vBNG M 261 (226). Client 258 outputs a first control negotiation packet to vBNG N 257 (230) and to vBNG M 261 (234).

Figure 4:
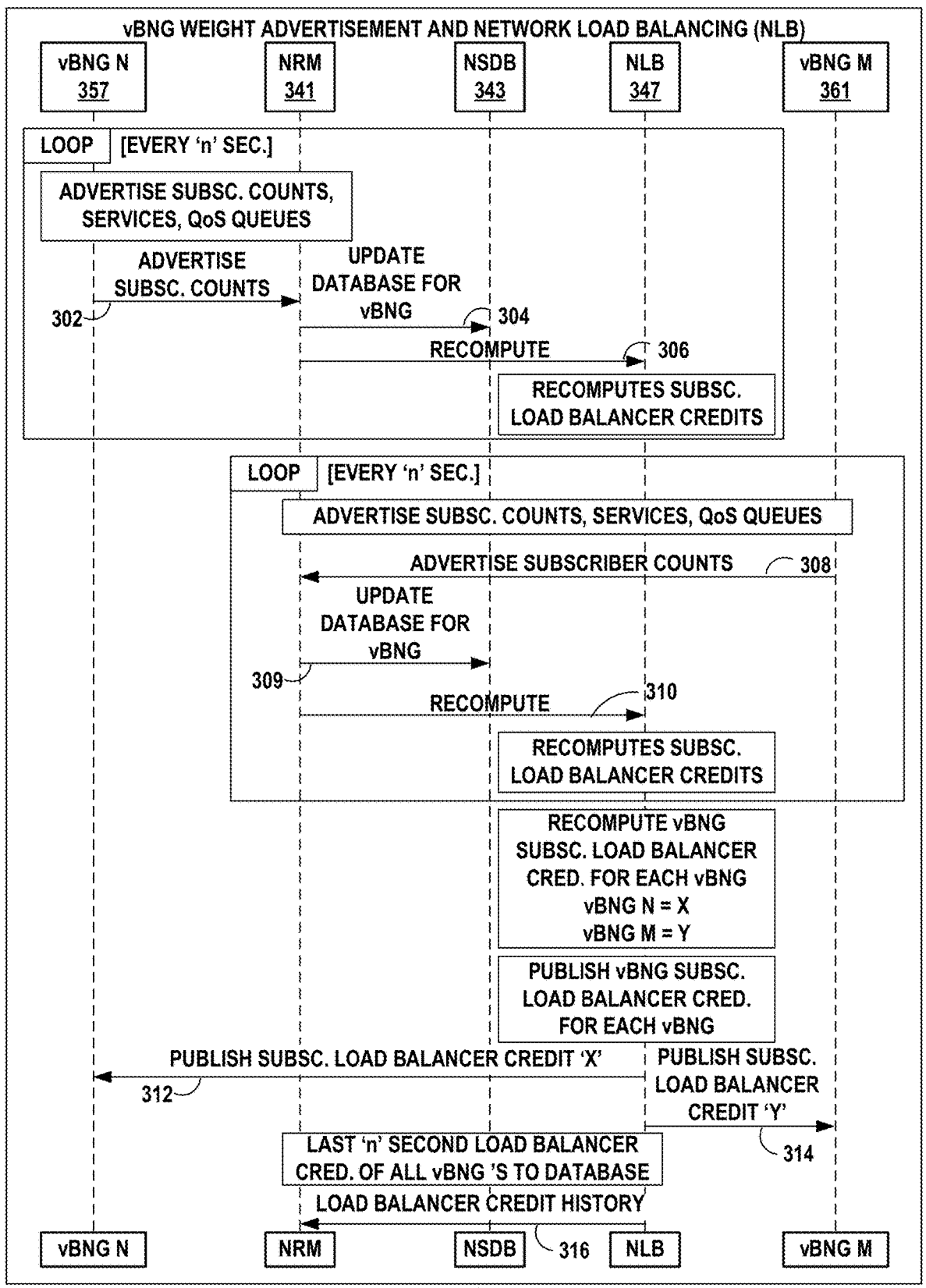
FIG. 4 is a sequence diagram illustrating an example network load balancing process in accordance with techniques described herein.

FIG. 4 is a sequence diagram illustrating an example network load balancing process in accordance with techniques described herein. FIG. 4 illustrates an example use case describing vBNG advertisement of present running resources local to it and load balancer actions on computing the inputs across vBNG advertising new subscriber credits to vBNG's. FIG. 4 is discussed with respect to FIG. 1 and FIG. 2 for exemplary purposes only. vBNG N 357 may be an example of vBNG N 57N of FIG. 2. vBNG M 361 may be an example of vBNG N 61N of FIG. 2. NRM 341 may be an example of NRM 41 of FIG. 2. NLB 347 may be an example of NLB 47 of FIG. 2. NSDB 343 may be an example of NSDB 43 of FIG. 2.

In the example of FIG. 4, when there is too much load of incoming subscribers or when the incoming subscriber load is out of proportionate across the instances, there is need to balance the load in order to achieve a higher call setup rate. As such, NLB 347 may maintain credits or tokens for each of the instances. Such credits or tokens may each indicate how many incoming subscriber logins a respective BNG instance may operate. NLB 347 may re-compute the tokens and/or credits based on the resources and current incoming subscriber rate. NLB 347 may be configured with low and high watermarks of a load. Depending upon the watermarks, NLB 347 may change a number of tokens per instance and publish to each of the instance. In this way, an instance may allow only those many incoming subscriber logins as described in the following.

Initially, every 'n' seconds, vBNG N 357 advertises subscriber counts (302). Said differently, for example, vBNG N 357 may periodically advertise subscriber information to NRM 341. In some instances, NRM 341 receives, from each vBNG instance of vBNG N 357 and vBNG N 361, a respective subscriber count. NRM 341 updates or modifies a database for vBNG N 357 (304). For instance, NRM 341 modify, for each vBNG instance of vBNG N 357 and vBNG N 361 a respective entry of NSDB 343 based on the respective subscriber count to generate modified subscriber count information. NRM 341 outputs an instruction to NLB 347 to recompute subscriber load balancer credits (306). Similarly, every 'n' seconds, vBNG M 361 advertises subscriber counts (308). In this example, NRM 341 updates NSDB 343 for vBNG M 361 (309). In this example, NRM 341 outputs an instruction to NLB 347 to recompute subscriber load balancer credits (310).

NLB 347 recomputes subscriber load balancer credits. More specifically, for example, NLB 347 recomputes vBNG subscriber load balancer credits for each vBNG. For instance, NLB 347 recomputes a subscriber load balancer credit 'X' for vBNG N 357 and recomputes a subscriber load balancer credit 'Y' for vBNG M 361. In this instance, NLB 347 may republish vBNG subscriber load balancer credits for each vBNG. In this case, NLB 347 publishes subscriber load balancer credit 'X' to vBNG N 357 (312) and publishes subscriber load balancer credit 'Y' to vBNG M 361 (314). That is, each vBNG instance of vBNG N 357 and vBNG M 361 may receive load balancing credit information from NLB 347 and may determine whether to receive a request to access service provider services based on the load balancing credit information. NLB 347 outputs load balancer credit history to NRM 341 (316).

Figure 5:
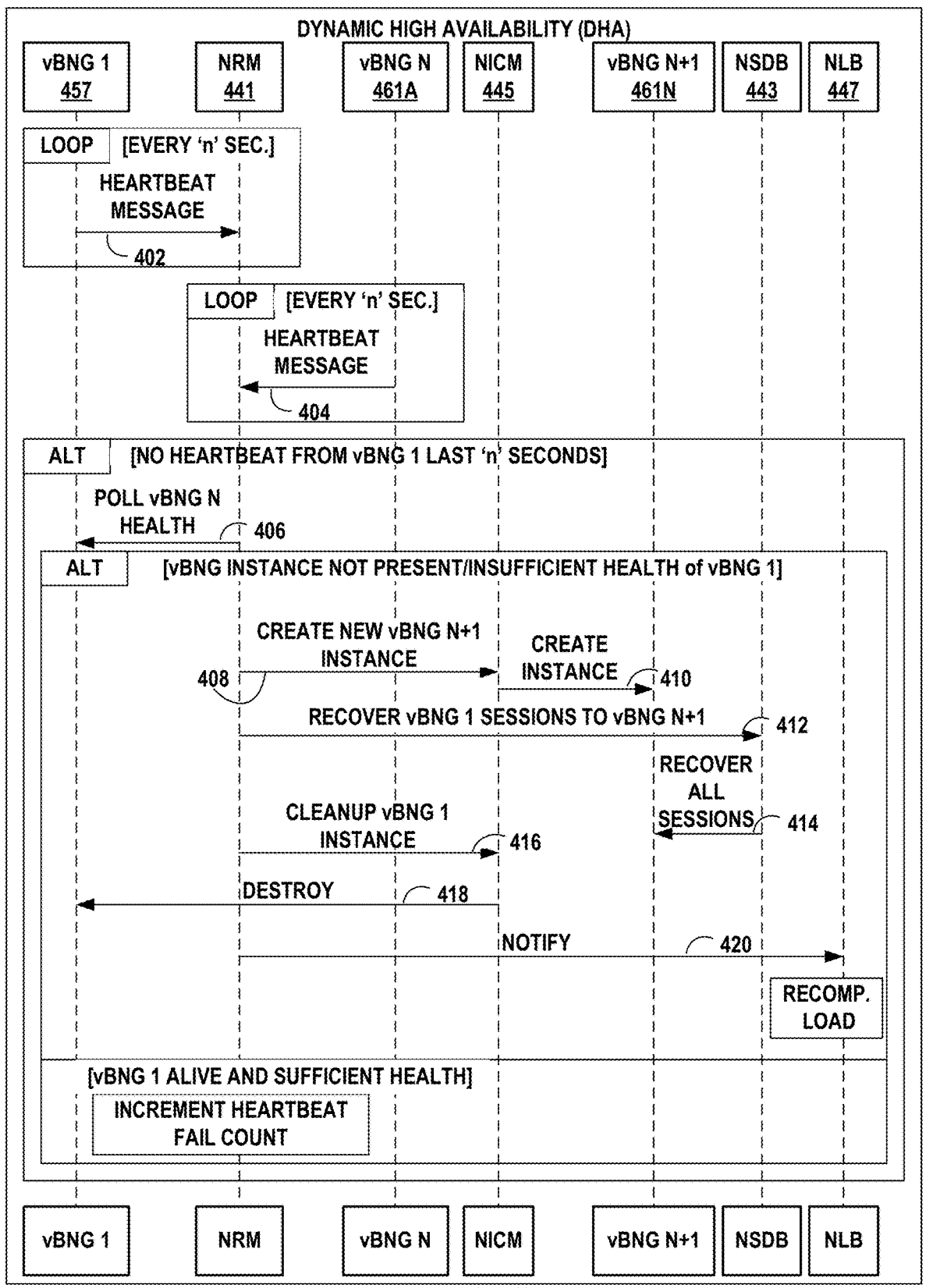
FIG. 5 is a sequence diagram illustrating an example dynamic high availability process in accordance with techniques described herein.

FIG. 5 is a sequence diagram illustrating an example dynamic high availability process in accordance with techniques described herein. FIG. 5 illustrates a use case describing dynamic high availability (DHA) when any vBNG instance is deemed unalive based on heartbeat and health. NRM 441, NICM 445, NLB 447, and NSDB 443 may create a new vBNG instance and recover all the subscriber and service information corresponding to the faulty vBNG. NRM 441 may instruct instance manager further to clean up the faulty vBNG. FIG. 5 is discussed with respect to FIG. 1 and FIG. 2 for exemplary purposes only. vBNG 1 457 may be an example of vBNG A 57N of FIG. 2. NRM 441 may be an example of NRM 41 of FIG. 2. vBNG N 461A may be an example of vBNG A 61N of FIG. 2. NICM 445 may be an example of NICM 45 of FIG. 2. vBNG N 461N may be an example of vBNG N 61N of FIG. 2. NSDB 443 may be an example of NSDB 43 of FIG. 2. NLB 447 may be an example of NLB 47 of FIG. 2.

Initially, every 'n' seconds, vBNG 1 457 sends heartbeat message to NRM 441 (402). Similarly, every 'n' seconds, vBNG N 461A sends heartbeat message to NRM 441 (404). Said differently, each of vBNG instance of vBNG 1 457 and vBNG N 461A may periodically output network health information to the BNG controller and NRM 441 may periodically receive health data of each vBNG instance of vBNG 1 457 and vBNG N 461A.

However, when vBNG 1 457 does not send a heartbeat message in last 'n' seconds, NRM 441 outputs a poll vBNG N health message to vBNG 1 457 (406). In response to determining that vBNG 1 457 is not present and/or that there is insufficient health at vBNG 1 457, NRM 441 outputs, to NICM 445, a request to create vBNG N+1 461N (408). Said differently, when health data for vBNG 1 457 is not received within a threshold time, NRM 441 may output, to NICM 445, a request to generate vBNG N+1 461N for recovering BNG subscriber sessions of vBNG 1 457. NICM 445 creates vBNG N+1 461N (410). NRM 441 outputs, to NSDB 443, an instruction to recover vBNG 1 session previously performed by vBNG 1 457 to vBNG N+1 461N (412). Said differently, NRM 441 may modify an entry of NSDB 443 corresponding to vBNG N+1 461N to recover BNG subscriber sessions of vBNG 1 457. NSDB 443 recovers all sessions previously performed by vBNG 1 457 to vBNG N+1 461N (414). For example, a BNG virtual machine manager (e.g., BNG VM manager 59, BNG VM manager 65, etc.) may be configured to generate vBNG N+1 461N to recreate subscribers replayed (e.g., exact, modified, etc.) subscriber information by NSDB 443 that previously corresponded to vBNG 1 457.

NRM 441 outputs, to NICM 445, a request to clean up vBNG 1 457 (416). Said differently, when health data for vBNG 1 457 is not received within the threshold time, NRM 441 outputs, to NICM 445, an instruction to destroy vBNG 1 457. NICM 445 outputs, to vBNG 1 457, an instruction to destroy vBNG 1 457 (418). Said differently, NICM 445 outputs an instruction, to an edge router that provisioned vBNG 1 457, to delete vBNG 1 457 in response to receiving the instruction to destroy vBNG 1 457 from NRM 441. In this example, vBNG 1 457 and/or a BNG virtual machine manager for vBNG 1 457 receives the instruction to destroy vBNG 1 457 and destroys the particular vBNG instance.

NRM 441 notifies NLB 447 to recompute the load (420). Said differently, NRM 441 outputs, to NLB 447, an instruction to recompute load balancing for vBNG N+1 461N. In this example, NLB 447 outputs a load balancer credit to vBNG N+1 461N in response to the instruction to recompute load balancing for vBNG N+1 461N. As shown in FIG. 5, when vBNG 1 457 does send a heartbeat message in last 'n' seconds, NRM 441 increments a heartbeat fail count.

Figure 6:
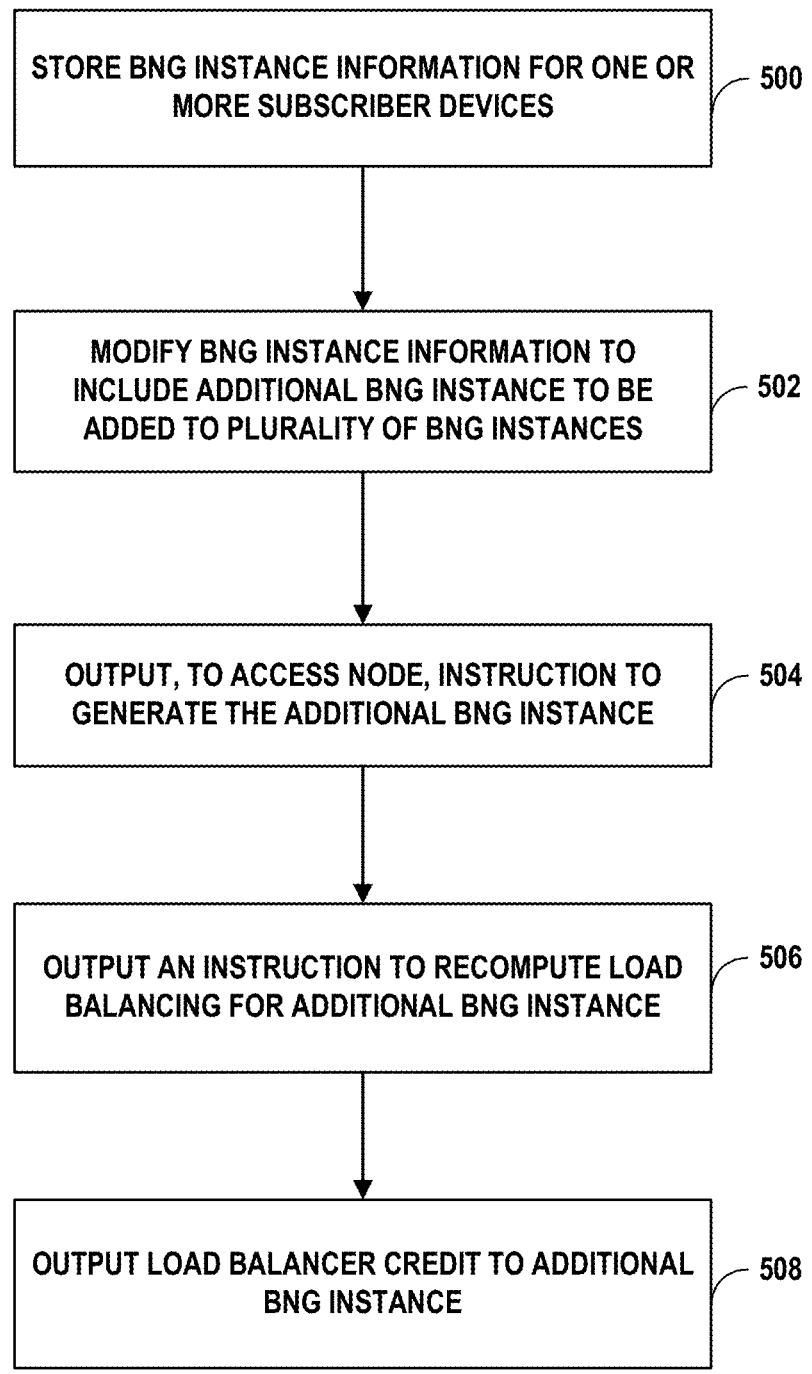
FIG. 6 is a flowchart illustrating an example mode of operation of a BNG controller in accordance with techniques described herein.

FIG. 6 is a flowchart illustrating an example mode of operation of a BNG controller in accordance with techniques described herein. FIG. 6 is discussed with respect to FIGS. 1-2 for exemplary purposes only.

NSDB 43 stores vBNG instance information for one or more subscriber devices (500). NICM 45 modifies vBNG instance information to include additional vBNG instance to be added to plurality of vBNG instances (502). For example, NRM 41 may output a request to NICM 45 to add additional vBNG instance. NICM 45 outputs, to edge router 30A, instruction to generate the additional vBNG instance (504). NRM 41 outputs, to NLB 47, an instruction to recompute load balancing for additional vBNG instance (506). NLB 47 outputs a load balancer credit to the additional vBNG instance (508).

Figure 7:
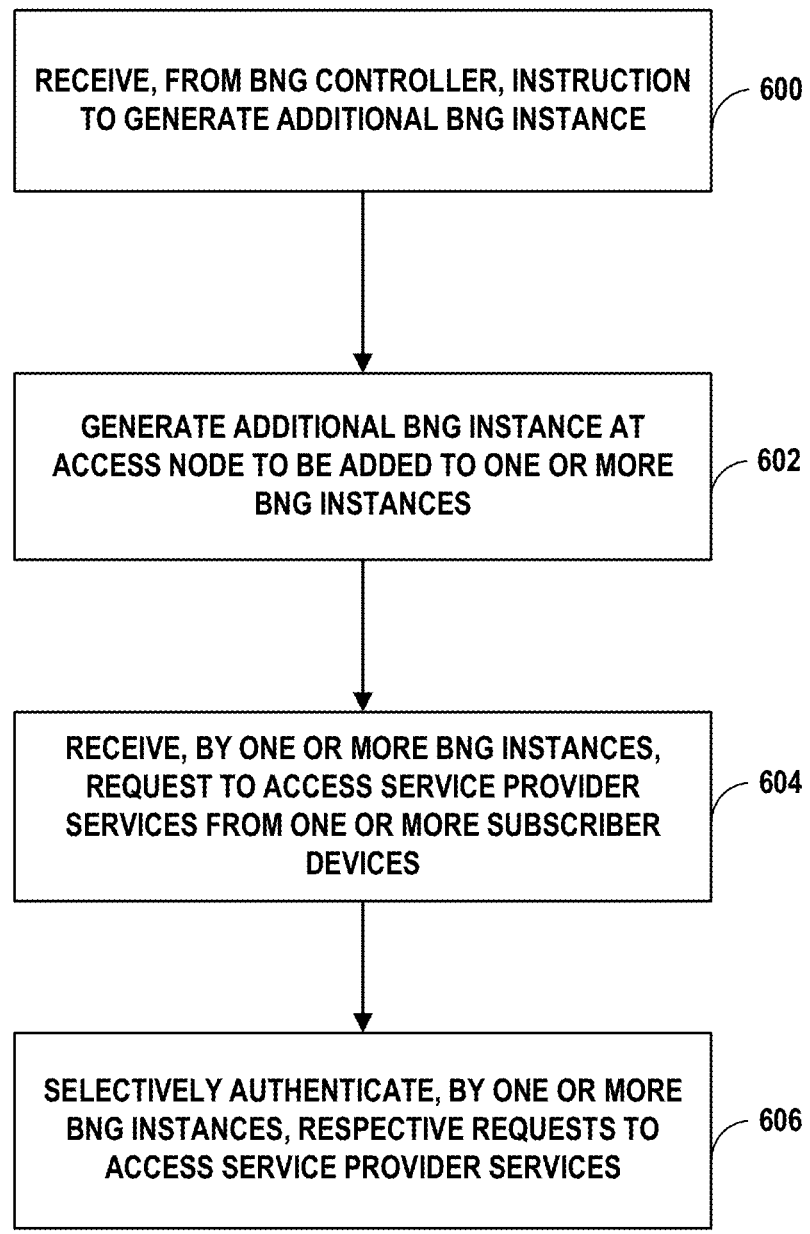
FIG. 7 is a flowchart illustrating an example mode of operation of an edge router in accordance with techniques described herein.

FIG. 7 is a flowchart illustrating an example mode of operation of an edge router in accordance with techniques described herein. FIG. 7 is discussed with respect to FIGS. 1-2 for exemplary purposes only.

BNG virtual machine manager 59 receives, from BNG controller 35, an instruction to generate an additional vBNG instance (600). For example, BNG virtual machine manager 59 receives an instruction to generate vBNG N 57N. BNG virtual machine manager 59 generates the additional vBNG instance at an edge router to be added to one or more vBNG instances. For example, BNG virtual machine manager 59 generates vBNG N 57N at edge router 30 to be added to vBNG N 57A-vBNG N 57M (not shown).

BNG instances 57 receive a request to access service provider services from one or more subscriber devices (604). For example, vBNG instances 57 receive requests to access service provider network 20 from subscriber devices 18. vBNG instances 57 selectively authenticate respective requests to access service provider services (606).

The techniques described herein may be implemented in hardware, software, firmware, or any combination thereof, in private or public cloud or standalone application, all the applications could be incorporated as one single application suite or different applications distributed in the network or at a centralized node. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium or computer-readable storage device may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

In addition to or as an alternative to the above, the following examples are described. The features described in any of the following examples may be utilized with any of the other examples described herein.

Example 1. A broadband network gateway (BNG) controller that manages virtual BNG (vBNG) instances, the BNG controller comprising: a memory; one or more processors in communication with the memory; a network subscriber database (NSDB) configured to store vBNG instance information for one or more subscriber devices, the vBNG instance information specifying a plurality of vBNG instances operable by one or more edge routers, wherein the plurality of vBNG instances are configured to receive requests to access service provider services from the one or more subscriber devices and to selectively authenticate the one or more subscriber devices for network services based on authentication information included in the requests to access services provider services; and one or more core applications operable by the one or more processors, wherein the one or more core applications include a network instance and configuration manager (NICM) configured to modify the vBNG instance information to include an additional vBNG instance to be added to the plurality of vBNG instances and to output, to an edge router of the one or more edge routers, an instruction to generate the additional vBNG instance at the edge router.

Example 2. The BNG controller of example 1, wherein the NICM is further configured to: receive one or more configuration updates; and output a configuration template specifying the one or more configuration updates to update each vBNG instance of the plurality of vBNG instances.

Example 3. The BNG controller of any combination of examples 1-2, wherein the one or more core applications include a network resource manager (NRM) configured to: receive a notification of insufficient resources from a particular vBNG instance of the plurality of vBNG instances; and output, to the NICM, a request to generate the additional vBNG instance for reducing a load at the particular vBNG instance in response to receiving the notification of insufficient resources, wherein the NICM is configured to output the instruction to generate the additional vBNG instance in response to the request to generate the additional vBNG instance.

Example 4. The BNG controller of example 3, wherein the one or more core applications include a network load balancer (NLB) configured to load balance the plurality of vBNG instances based on the vBNG instance information and wherein the NRM is further configured to: output, to the NLB, a notification for recomputing load balancing in response to receiving the notification of insufficient resources; and output, to the NLB, an instruction to recompute load balancing for the additional vBNG instance, wherein the NLB outputs a load balancer credit to the additional vBNG instance in response to the instruction to recompute load balancing for the additional vBNG instance.

Example 5. The BNG controller of any combination of examples 1-2, wherein the one or more core applications include a network load balancer (NLB) configured to load balance the plurality of vBNG instances based on the vBNG instance information and a network resource manager (NRM) configured to: receive, from each vBNG instance of the plurality of vBNG instances, a respective subscriber count or a respective inflight information count; and modify, for each vBNG instance of the plurality of vBNG instances, a respective entry of the NSDB based on the respective subscriber count or the respective inflight information count to generate modified subscriber information, wherein the NLB is configured to: recompute, for each vBNG instance of the plurality of vBNG instances, a subscriber load balancer credit based on the modified subscriber information; output, to each vBNG instance of the plurality of vBNG instances, a respective subscriber load balancer credit; and output a load balancer credit history to the NRM, the load balancer credit history being generated based on each respective subscriber load balancer credit.

Example 6. The BNG controller of any combination of examples 1-2, wherein the one or more core applications include a network resource manager (NRM) configured to: periodically receive health data of each vBNG instance of the plurality of vBNG instances; and when health data for a particular vBNG instance of the plurality of vBNG instances is not received within a threshold time, output, to the NICM, a request to generate the additional vBNG instance for recovering BNG subscriber sessions of the particular vBNG instance from the NSDB, wherein the NICM is configured to output the instruction to generate the additional vBNG instance in response to the request to generate the additional vBNG instance and to recover the BNG subscriber sessions of the particular vBNG instance from the NSDB.

Example 7. The BNG controller of example 6, wherein the NRM is configured to: when health data for the particular vBNG instance of the plurality of vBNG instances is not received within the threshold time, output, to the NICM, an instruction to destroy the particular vBNG instance, wherein the NICM is further configured to output an instruction, to edge router of the one or more edge routers that provisioned the particular vBNG instance, to delete the particular vBNG instance in response to receiving the instruction to destroy the particular vBNG instance.

Example 8. The BNG controller of any combination of examples 6-7, wherein the one or more core applications include a network load balancer (NLB) configured to load balance the plurality of vBNG instances based on the vBNG instance information and wherein the NRM is further configured to: modify an entry of the NSDB corresponding to the additional vBNG instance to recover BNG subscriber sessions of the particular vBNG instance; and output, to the NLB, an instruction to recompute load balancing for the additional vBNG instance, wherein the NLB outputs a load balancer credit to the additional vBNG instance in response to the instruction to recompute load balancing for the additional vBNG instance.

Example 9. The BNG controller of any combination of examples 1-8, wherein the NSDB includes subscriber colocation information and BNG specific information.

Example 10. The BNG controller of any combination of examples 1-9, wherein the one or more core applications include subscriber analytics (SA) configured to: receive analytics data from at least one of the plurality of vBNG instances; and generate subscriber behavior data based on the analytics data for operating the plurality of vBNG instances.

Example 11. The BNG controller of any combination of examples 1-10, wherein the one or more core applications include unified network security management (UNSM) configured to: receive network security data from the plurality of vBNG instances; analyze the received network security data to generate one or more alerts; output the one or more alerts; and configure, with the NICM, the plurality of vBNG instances based on the network security data.

Example 12. The BNG controller of any combination of examples 1-11, wherein the one or more core applications include dynamic high availability (DHA) configured to: dynamically spawn an additional vBNG instance to provide high availability to an existing vBNG instance of the plurality of vBNG instances, based on a configuration policy; and dynamically collapse one or more vBNG instances which were providing high availability, based on the configuration policy.

Example 13. The BNG controller of any combination of examples 1-12, wherein the BNG controller that manages the vBNG instances further manages one or more physical BNGs and wherein each physical BNG of the one or more physical BNGs is configured to manage subscriber management centrally.

Example 14. The BNG controller of any combination of examples 1-13, wherein the one or more core applications are executed at a centralized computing device or executed at a plurality of networked computing elements distributed in a cloud configuration.

Example 15. A method for managing subscriber logins for network subscribers, the method comprising: storing, by a network subscriber database (NSDB) of a broadband network gateway (BNG) controller, vBNG instance information for one or more subscriber devices, the vBNG instance information specifying a plurality of vBNG instances operable by one or more edge routers, wherein the plurality of vBNG instances are configured to receive requests to access service provider services from the one or more subscriber devices and to selectively authenticate the one or more subscriber devices based on authentication information included in the requests to access services provider services; modifying, by a network instance and configuration manager (NICM) operable by one or more processors of the BNG controller, the vBNG instance information to include an additional vBNG instance to be added to the plurality of vBNG instances; and outputting, by the NICM, to an edge router of the one or more edge routers, an instruction to generate the additional vBNG instance at the edge router.

Example 16. The method of example 15, further comprising: receiving, by a network resource manager (NRM) operable by the one or more processors, a notification of insufficient resources from a particular vBNG instance of the plurality of vBNG instances; outputting, by the NRM, to the NICM, a request to generate the additional vBNG instance for reducing a load at the particular vBNG instance in response to receiving the notification of insufficient resources, wherein outputting the instruction to generate the additional vBNG instance is in response to the request to generate the additional vBNG instance.

Example 17. The method of example 16, further comprising: outputting, by the NRM, to a network load balancer (NLB) operable by the one or more processors, a notification for recomputing load balancing in response to receiving the notification of insufficient resources; outputting, by the NRM, to the NLB, an instruction to recompute load balancing for the additional vBNG instance; and outputting, by the NLB, a load balancer credit to the additional vBNG instance in response to the instruction to recompute load balancing for the additional vBNG instance.

Example 18. The method of example 15, further comprising: receiving, by a network resource manager (NRM) operable by the one or more processors, from each vBNG instance of the plurality of vBNG instances, a respective subscriber count; modifying, by the NRM, for each vBNG instance of the plurality of vBNG instances, a respective entry of the NSDB based on the respective subscriber count to generate modified subscriber count information; recomputing, by network load balancer (NLB) operable by the one or more processors, for each vBNG instance of the plurality of vBNG instances, a subscriber load balancer credit based on the modified subscriber count information; outputting, by the NLB, to each vBNG instance of the plurality of vBNG instances, a respective subscriber load balancer credit; and outputting, by the NLB, a load balancer credit history to the NRM, the load balancer credit history being generated based on each respective subscriber load balancer credit.

Example 19. The method of example 15, further comprising: periodically receiving health data of each vBNG instance of the plurality of vBNG instances; when health data for a particular vBNG instance of the plurality of vBNG instances is not received within a threshold time, outputting, by a network resource manager (NRM) operable by the one or more processors, to the NICM, a request to generate the additional vBNG instance for recovering BNG subscriber sessions of the particular vBNG instance, wherein outputting the instruction to generate the additional vBNG instance is in response to the instruction to create the additional vBNG instance and wherein modifying the vBNG instance information comprises recovering the BNG subscriber sessions of the particular vBNG instance from the NSDB.

Example 20. The method of example 19, further comprising: when health data for the particular vBNG instance of the plurality of vBNG instances is not received within the threshold time, outputting, by the NRM, to the NICM, an instruction to destroy the particular vBNG instance; and outputting, by the NICM, to an edge router of the one or more edge routers that provisioned the particular instance, an instruction to delete the particular vBNG instance in response to receiving the instruction to destroy the particular vBNG instance.

Example 21. The method of any combination of examples 19-20, further comprising: modifying, by the NRM, an entry of the NSDB corresponding to the additional vBNG instance to recover BNG subscriber sessions of the particular vBNG instance; and outputting, by the NRM, to a network load balancer (NLB) operable by the one or more processors, an instruction to recompute load balancing for the additional vBNG instance; and outputting, by the NLB, a load balancer credit to the additional vBNG instance in response to the instruction to recompute load balancing for the additional vBNG instance.

Example 22. An edge router comprising: a memory; one or more processors in communication with the memory; a broadband network gateway (BNG) virtual machine manager operable by the one or more processors and configured to receive, from a BNG controller, an instruction to generate a virtual BNG (vBNG) instance and, in response to the instruction, generate the vBNG instance to provision one or more vBNG instances at the edge router; and one or more vBNG instances operable by the one or more processors and configured to receive a request to access service provider services from one or more subscriber devices, and selectively authenticate the one or more subscriber devices based on authentication information included in the requests to access services provider services.

Example 23. The edge router of example 22, wherein each vBNG instance of the one or more vBNG instances is further configured to: in response to determining that the vBNG instance does not have enough computational resources to process a subscriber login from a subscriber device of the one or more subscriber devices: output a notification to the BNG controller indicating a lack of computational resources; and output a rejection message to the subscriber device.

Example 24. The edge router of any combination of examples 22-23, wherein each vBNG instance of the one or more vBNG instances is further configured to: periodically advertise subscriber information to the BNG controller; and receive load balancing credit information from the BNG controller, wherein each vBNG instance of the one or more vBNG instances is configured to determine whether to receive the request to access service provider services based on the load balancing credit information.

Example 25. The edge router of any combination of examples 22-24, wherein each vBNG instance of the one or more vBNG instances is further configured to: periodically output network health information to the BNG controller.

Example 26. The edge router of any combination of examples 22-25, wherein each vBNG instance of the one or more vBNG instances is further configured to: receive configuration updates from a network instance and configuration manager (NICM) of the BNG controller; exchange security related information with the NICM of the BNG controller; receive updates from a unified network security management (UNSM) of the BNG controller; receive load balancing credit information from the BNG controller; or synchronize a local database with a network subscriber database (NSDB) of the BNG controller.

Example 27. The edge router of any combination of examples 22-25, wherein, to generate the vBNG instance, the BNG virtual machine manager is configured to generate the vBNG instance to recreate replayed subscriber information by a network subscriber database (NSDB) of the BNG controller.

Example 28. The edge router of any combination of examples 22-27, wherein the BNG virtual machine manager is further configured to: receive, from the BNG controller, an instruction to destroy a particular vBNG instance of the one or more vBNG instances; and destroy the particular vBNG instance in response to the instruction to destroy the particular vBNG instance.

Example 29. A method comprising: receiving, by a broadband network gateway (BNG) virtual machine manager operable by one or more processors of an edge router, from a BNG controller, an instruction to generate a virtual BNG (vBNG) instance; and generating, by the BNG virtual machine manager, the vBNG instance at the edge router to provision one or more vBNG instances operable by the one or more processors in response to the instruction; receiving, by the one or more vBNG instances operable by the one or more processors, a request to access service provider services from one or more subscriber devices; and selectively authenticating, by the one or more vBNG instances, the one or more subscriber devices based on authentication information included in the requests to access services provider services.

Example 30. The method of example 29, further comprising: in response to determining, by a particular vBNG instance of the one or more vBNG instances, that the vBNG instance does not have enough computational resources to process a subscriber login from a subscriber device of the one or more subscriber devices: outputting, by the particular vBNG instance, a notification to the BNG controller indicating a lack of computational resources; and outputting, by the particular vBNG instance, a rejection message to the subscriber device.

Example 31. The method of any combination of examples 29-30, further comprising: periodically advertising, by each vBNG instance of the one or more vBNG instances, subscriber information to the BNG controller; receiving, by each vBNG instance of the one or more vBNG instances, load balancing credit information from the BNG controller; and determining, by each vBNG instance of the one or more vBNG instances, whether to receive the request to access service provider services based on the load balancing credit information.

Example 32. The method of any combination of examples 29-31, further comprising: periodically outputting, by each vBNG instance of the one or more vBNG instances, network health information to the BNG controller.

Example 33. The method of any combination of examples 29-32, further comprising: receiving, by the BNG virtual machine manager, from the BNG controller, an instruction to destroy a particular vBNG instance of the one or more vBNG instances; and destroying, by the BNG virtual machine manager, the particular vBNG instance in response to the instruction to destroy the particular vBNG instance.

Example 34. The method of any combination of examples 29-33, wherein each vBNG instance of the one or more vBNG instances is further configured to: receive configuration updates from a network instance and configuration manager (NICM) of the BNG controller; exchange security related information with the NICM; receive updates from a unified network security management (UNSM) of the BNG controller; receive load balancing credit information from a network load balancer (NLB) of the BNG controller; or synchronize a local database with a network subscriber database (NSDB) of the BNG controller.

Example 35. The method of any combination of examples 29-33, wherein generating the vBNG instance comprises generating the vBNG instance to recreate replayed subscriber information by a network subscriber database (NSDB) of the BNG controller.

Example 36. The method of any combination of examples 29-35, wherein each vBNG instance of the one or more vBNG instances is further configured to: receive a configuration template specifying one or more configuration updates; and apply the configuration template to implement the one or more configuration updates.

Moreover, any of the specific features set forth in any of the examples described above may be combined into beneficial examples of the described techniques. That is, any of the specific features are generally applicable to all examples of the invention. Various embodiments have been described. These and other embodiments are within the scope of the following examples.

What is claimed is:
1. An edge router comprising:
a memory;
one or more processors in communication with the memory;
a broadband network gateway (BNG) virtual machine manager operable by the one or more processors and configured to receive, from a BNG controller, an instruction to generate a virtual BNG (vBNG) instance and, in response to the instruction, generate the vBNG instance to provision one or more vBNG instances at the edge router; and
the one or more vBNG instances operable by the one or more processors, wherein the vBNG instance of the one or more vBNG instances is configured to:
  receive load balancing credit information from the BNG controller;
  authenticate a first subscriber device based on both authentication information included in a first request to access services provider services and the load balancing credit information received from the BNG controller;
  based on the authentication of the first subscriber device, increment inflight information to generate updated inflight information;
  output the updated inflight information to the BNG controller;
  receive updated load balancing credit information from the BNG controller; and
  authenticate a second subscriber device based on both authentication information included in a second request to access services provider services and the updated load balancing credit information received from the BNG controller.

2. The edge router of claim 1, wherein, to output the updated inflight information, the vBNG instance is configured to periodically advertise the updated inflight information.

3. The edge router of claim 1, wherein each vBNG instance of the one or more vBNG instances is further configured to:
periodically output network health information to the BNG controller.

4. The edge router of claim 1, wherein each vBNG instance of the one or more vBNG instances is further configured to:
receive configuration updates from a network instance and configuration manager (NICM) of the BNG controller;
exchange security related information with the NICM of the BNG controller;
receive updates from a unified network security management (UNSM) of the BNG controller;
or
synchronize a local database with a network subscriber database (NSDB) of the BNG controller.

5. The edge router of claim 1, wherein, to generate the vBNG instance, the BNG virtual machine manager is configured to generate the vBNG instance to recreate replayed subscriber information by a network subscriber database (NSDB) of the BNG controller.

6. The edge router of claim 1, wherein the BNG virtual machine manager is further configured to:
receive, from the BNG controller, an instruction to destroy a particular vBNG instance of the one or more vBNG instances; and
destroy the particular vBNG instance in response to the instruction to destroy the particular vBNG instance.

7. A method comprising:
receiving, by a broadband network gateway (BNG) virtual machine manager operable by one or more processors of an edge router, from a BNG controller, an instruction to generate a virtual BNG (vBNG) instance;
generating, by the BNG virtual machine manager, the vBNG instance at the edge router to provision one or more vBNG instances operable by the one or more processors in response to the instruction;
receiving, by the vBNG instance, load balancing credit information from the BNG controller;
authenticating, by the vBNG instance, a first subscriber device based on both authentication information included in a first request to access services provider services and the load balancing credit information received from the BNG controller;
based on the authentication of the first subscriber device, incrementing, by the vBNG instance, inflight information to generate updated inflight information;
outputting, by the vBNG instance, the updated inflight information to the BNG controller;
receiving, by the vBNG instance, updated load balancing credit information from the BNG controller; and
authenticating, by the vBNG instance, a second subscriber device based on both authentication information included in a second request to access services provider services and the updated load balancing credit information received from the BNG controller.

8. The method of claim 7, wherein outputting the updated inflight information comprises periodically advertising the updated inflight information.

9. The method of claim 7, further comprising:
periodically outputting, by each vBNG instance of the one or more vBNG instances, network health information to the BNG controller.

10. The method of claim 7, further comprising:
receiving, by the BNG virtual machine manager, from the BNG controller, an instruction to destroy a particular vBNG instance of the one or more vBNG instances; and
destroying, by the BNG virtual machine manager, the particular vBNG instance in response to the instruction to destroy the particular vBNG instance.

11. The method of claim 7, wherein each vBNG instance of the one or more vBNG instances is further configured to:
receive configuration updates from a network instance and configuration manager (NICM) of the BNG controller;
exchange security related information with the NICM;
receive updates from a unified network security management (UNSM) of the BNG controller;
or
synchronize a local database with a network subscriber database (NSDB) of the BNG controller.

12. The method of claim 7, wherein generating the vBNG instance comprises generating the vBNG instance to recreate replayed subscriber information by a network subscriber database (NSDB) of the BNG controller.

* * * * *